United States Patent
Yamauchi et al.

(10) Patent No.: US 7,781,088 B2
(45) Date of Patent: *Aug. 24, 2010

(54) NON-AQUEOUS ELECTROLYTE SECONDARY CELL

(75) Inventors: Yasuhiro Yamauchi, Moriguchi (JP);
Naoya Nakanishi, Moriguchi (JP);
Toshiyuki Nohma, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,689

(22) Filed: Aug. 13, 2007

(65) Prior Publication Data

US 2008/0038627 A1  Feb. 14, 2008

(30) Foreign Application Priority Data

Aug. 11, 2006 (JP) ............................. 2006-220676
Sep. 11, 2006 (JP) ............................. 2006-246127

(51) Int. Cl.
*H01M 2/12* (2006.01)
*H01M 10/00* (2006.01)
(52) U.S. Cl. ..................................... 429/53; 429/61
(58) Field of Classification Search .................. 429/56, 429/174, 65
See application file for complete search history.

(56) References Cited

U.S. PATENT DOCUMENTS

| | | |
|---|---|---|
| 5,705,290 A | 1/1998 | Azema |
| 5,766,790 A | 6/1998 | Kameishi et al. |
| 6,228,523 B1 * | 5/2001 | Azema ........................ 429/61 |
| 6,248,470 B1 * | 6/2001 | Azema et al. ................. 429/61 |
| 2004/0033416 A1 * | 2/2004 | Kim et al. .................... 429/175 |
| 2004/0258986 A1 * | 12/2004 | Shen et al. .................. 429/161 |
| 2006/0078787 A1 * | 4/2006 | Sato et al. ..................... 429/62 |
| 2007/0026302 A1 * | 2/2007 | Yoon ........................... 429/129 |
| 2007/0037054 A1 * | 2/2007 | Kikuchi et al. .............. 429/178 |

FOREIGN PATENT DOCUMENTS

| | | |
|---|---|---|
| JP | 04-24262 U | 2/1992 |
| JP | 08-171898 A | 7/1996 |
| JP | 08-293301 A | 11/1996 |
| JP | 09-55197 A | 2/1997 |
| JP | 10-241653 A | 9/1998 |
| JP | 11-154504 A | 6/1999 |
| JP | 11-307080 A | 11/1999 |
| JP | 11-329405 A | 11/1999 |

* cited by examiner

*Primary Examiner*—Patrick Ryan
*Assistant Examiner*—Stephen Yanchuk
(74) *Attorney, Agent, or Firm*—Westerman, Hattori, Daniels & Adrian, LLP

(57) ABSTRACT

A non-aqueous electrolyte secondary battery has a current interrupting mechanism with excellent impact and vibration resistance. The mechanism includes a fragile portion which breaks when the diaphragm deforms and rises upward, thereby interrupting current flow thereto; and an insulating current collecting tab holder into which a part of a current collecting tab is inserted. The tab holder has a tab receiving portion into which the insert member of the tab is inserted. The tab receiving portion is provided on the inner and outer surfaces thereof with a holder hole, which overlaps with a throughhole when the insert member is inserted. The diaphragm is disposed outside the tab receiving portion so as to cover the holder hole and electrically connected at its center bottom to the fragile portion via the holder hole. The gas pressure in the battery acts on the fragile portion and the inner side of the diaphragm.

20 Claims, 8 Drawing Sheets

(a)

current path (b)

diaphragm deforms cell internal pressure increases fragile portion breaks (a)

7 c (b)

7 b (c)

7 a

NON-AQUEOUS ELECTROLYTE SECONDARY CELL

BACKGROUND OF THE INVENTION

1. Field of the Invention

The present invention relates to non-aqueous electrolyte secondary batteries, and more particularly to non-aqueous electrolyte secondary batteries having a current interrupting mechanism with excellent impact resistance.

2. Description of the Prior Art

In recent years, non-aqueous electrolyte secondary batteries have been used not only in compact devices such as mobile phones, notebook PCs, and digital cameras but also as the power source for driving electric vehicles and hybrid vehicles.

When used for the latter application, a plurality of batteries are connected in series to produce a high output. Non-aqueous electrolyte secondary batteries are made of highly reactive materials and therefore required to have a higher safety level than when used as the power source in the latter application than when used in compact devices. These secondary batteries are also required to have excellent impact and vibration resistance due to the characteristics of the application.

In attempts to improve battery safety, various examples of current interrupting mechanism have been proposed in Patent Documents 1 to 8 shown below to interrupt current flow when battery internal pressure increases.

Patent Document 1: Japanese Utility Model No. 04-24262
Patent Document 2: Japanese Patent Unexamined Publication No. 10-241653
Patent Document 3: Japanese Patent Unexamined Publication No. 08-171898
Patent Document 4: Japanese Patent Unexamined Publication No. 08-293301
Patent Document 5: Japanese Patent Unexamined Publication No. 09-55197
Patent Document 6: Japanese Patent Unexamined Publication No. 11-307080
Patent Document 7: Japanese Patent Unexamined Publication No. 11-154504
Patent Document 8: Japanese Patent Unexamined Publication No. 11-329405

These examples of current interrupting mechanism, however, are susceptible to malfunction due to vibration or impact.

SUMMARY OF THE INVENTION

An object of the present invention is to provide a non-aqueous electrolyte secondary battery with a current interrupting mechanism having high impact and vibration resistance.

In order to achieve the object, the non-aqueous electrolyte secondary battery having the fundamental structure (referred to as a first aspect) of the present invention includes;

an outer can having an opening;

an electrode assembly (10) housed in the outer can, the electrode assembly comprising a positive electrode having a positive electrode current collector and a negative electrode having a negative electrode current collector;

a sealing plate (3) sealing the opening;

a current collecting tab (9) connected to one of the positive electrode current collector and the negative electrode current collector;

an external electrode terminal (1) projecting outside the sealing plate (3);

a diaphragm (6) disposed inside the sealing plate (3) and outside the current collecting tab (9) in the battery, the diaphragm (6) being electrically connected to the external electrode terminal (1) and deforming toward the outside of the battery when the battery internal pressure increases;

a fragile portion connected at the center portion thereof to the inner surface of the diaphragm (6) and also connected at the periphery thereof to the current collecting tab (9) disposed below the diaphragm (6), the fragile portion breaking when the diaphragm (6) deforms and rises upward, thereby interrupting current flow to the diaphragm (6); and a current collecting tab holder (7) into which a part of the current collecting tab (9) is inserted.

The current collecting tab (9) includes a planar insert member (9a) having the fragile portion and a current collector connecting portion (9b) connected to one of the positive electrode current collector and the negative electrode current collector.

The current collecting tab holder (7) is insulating and has a tab receiving portion (7a) into which an insert member (9a) of the current collecting tab (9) is inserted, the tab receiving portion (7a) is provided on both an inner surface and an outer surface thereof with a holder hole (7c), the holder hole (7c) overlapping with the fragile portion when the insert member (9a) is inserted.

The diaphragm (6) is disposed outside the tab receiving portion (7a) so as to cover the holder hole (7c) and is electrically connected at the center bottom thereof to the fragile portion via the holder hole (7c).

The fragile portion in the aforementioned structure is a part of the planar insert member (9a) that is designed to be susceptible to breakage. The fragile portion is broken due to the deformation of the diaphragm (6), thereby interrupting the current flow between the current collecting tab (9) and the external electrode terminal (1). The fragile portion may be formed by reducing part of the planar insert member (9a) in thickness (the first aspect of the present invention). Alternatively, the fragile portion may be formed by other methods, such as by forming a throughhole (9c) in the planar insert member (9a) and covering the throughhole (9c) with a metal thin film (8) (a second aspect of the present invention).

These components of the non-aqueous electrolyte secondary battery are described as follows with reference to FIGS. 1 to 5. As shown in FIGS. 4A and 4B, the battery includes the diaphragm 6 and the fragile portion. The diaphragm 6 deforms in such a manner that its center portion rises toward the outside of the battery when the battery internal pressure increases. The fragile portion is connected at its center to the inner surface of the diaphragm 6 and also connected at its periphery to the current collecting tab 9 disposed below the diaphragm 6. The fragile portion breaks when the diaphragm 6 deforms and rises upward, thereby interrupting the current flow to the diaphragm 6.

Therefore, when the battery internal pressure increases, the center portion of the diaphragm 6 rises toward the outside of the battery as shown in FIG. 4B. This causes the fragile portion connected to the center bottom of the diaphragm 6 to break, thereby interrupting the current flow from the current collecting tab 9 to the diaphragm 6.

The term "diaphragm" refers to a membrane for insulation purposes in its broadest meaning.

The fragile portion can be formed by making a part of the planar insert member 9a smaller in thickness than the remaining portion by forging or other processes. Alternatively, the fragile portion may be formed by covering the throughhole 9c formed in the planar insert member 9a of the current collecting tab 9 with the metal thin film 8 (the second aspect). The pressure to break the fragile portion can be controlled by controlling the partial thickness of the planar insert member 9a without forming the throughhole 9c in the former method or can be controlled by controlling the thickness of the metal thin film (8) in the latter method.

The planar insert member 9a of the current collecting tab 9 is inserted into and held in the current collecting tab holder 7 having the tab receiving portion 7a. The current collecting tab holder 7 protects the thin-walled portion of the planar insert member 9a of the current collecting tab 9 from impact or vibration. This prevents the fragile portion from being unnecessary broken by impact or other causes and also prevents the current flow from being interrupted (prevention of safety mechanism malfunction).

In the non-aqueous electrolyte secondary battery according to the fundamental structure of the present invention, the current collecting tab (9) may be made of aluminum or aluminum alloy; and the external electrode terminal (1) may be a positive electrode terminal (a third aspect of the present invention).

Aluminum and aluminum alloy, which are easy to process and therefore facilitate the control of the operating pressure of the fragile portion, are preferable materials for the current collecting tab, but may be electrically dissolved when used in a negative electrode. Therefore, a current collecting tab made of aluminum or aluminum alloy is preferably used in a positive electrode system, so that the external electrode terminal 1 is preferably a positive electrode terminal. In the case where the current interrupting mechanism is provided to the positive electrode terminal, components to be electrically connected to the positive electrode such as the positive electrode terminal, the sealing plate, the sealing lead, and the positive electrode current collector are preferably made of aluminum or aluminum alloy. Aluminum and aluminum alloy are lightweight and highly conductive.

In the non-aqueous electrolyte secondary battery according to the fundamental structure of the present invention, the sealing plate (3) may include a flat surface and a projection projecting outside the flat surface, the projection allowing the external electrode terminal to project therefrom toward the outside of the battery and accommodating the inner end of the external electrode terminal in the inner space thereof (a fourth aspect of the present invention).

In a large size battery, the battery outer surface from which the external electrode terminal projects is used as a space to provide electrical components such as a voltage detection cable and a temperature detection cable or a cell cooling passage and an exhaust gas passage that is used when a gas relief valve operates. Therefore, it is important that the battery outer surface has enough space available for these purposes. The aforementioned structure ensures such a space on the battery outer surface and increases the space volume inside the battery. The increased space inside the battery (the space of the projection) can accommodate at least the inner end of the external electrode terminal to ensure a sufficient space for the electrode assembly, which is the main body of the battery. As a result, battery capacity can be increased.

In the non-aqueous electrolyte secondary battery according to the fundamental structure of the present invention, the electrode assembly may be a coiled electrode assembly comprising a positive electrode and a negative electrode coiled together and be housed in the outer can laterally to the can axis; and the current collector connecting portion (9b) of the current collecting tab (9) may be connected to one of the positive-electrode current-collector protrusions and the negative-electrode current-collector protrusions projecting from one end surface of the coiled electrode assembly (a fifth aspect of the present invention).

This structure increases the battery capacity per unit volume and facilitates the connection of the current collecting tab to the electrode assembly.

In the non-aqueous electrolyte secondary battery of the fifth aspect of the present invention, the current collector connecting portion (9b) of the current collecting tab (9) may be designed to sandwich the one of the positive-electrode current-collector protrusions and the negative-electrode current-collector protrusions projecting from the one end surface of the coiled electrode assembly. This structure facilitates the connection of the current collecting tab to the coiled electrode assembly and provides a high current extraction efficiency.

In the aforementioned structure, the current collecting tab holder (7) may be made of an insulating resin.

In this structure, the resin having an appropriate elasticity can improve both insulating properties and impact resistance. Examples of the insulating resin include polypropylene, polyphenylene sulfide, polyetheretherketone, and a tetrafluoroethylene-perfluoroalkoxyethylene copolymer.

In the non-aqueous electrolyte secondary battery having the aforementioned structure, the external electrode terminal (1) may be provided therein with a pressure release hole consisting of a vertical hole (1a) and a horizontal hole (1b), the vertical hole (1a) extending in the axial direction from the inner end to the outer end of the battery, and the horizontal hole (1b) having an opening open to the outside of the battery and being communicated with the vertical hole (1a) (a sixth aspect of the present invention).

This structure enables the pressure of the space formed by the sealing lead 5 and the diaphragm 6 to be kept equal to the pressure outside the battery even after the deformation of the diaphragm, thereby facilitating the deformation of the diaphragm 6 due to an increase in the battery internal pressure.

In the non-aqueous electrolyte secondary battery having the aforementioned structure, the sealing plate may further include a gas relief valve, and the fragile portion may have a smaller operating pressure than the gas relief valve (a seventh aspect of the present invention).

This structure enables the gas relief valve to cooperate with the current interrupting mechanism to further improve the safety of the battery. However, in terms of safety improvement, the pressure to break the metal thin film (8) is preferably smaller than the gas exhaust pressure of the gas relief valve. The metal thin film (8) is one of the primary components of the current interrupting mechanism.

In the non-aqueous electrolyte secondary battery having the aforementioned structure, the outer can may be prismatic in shape (an eighth aspect of the present invention).

Batteries with prismatic outer cans can be efficiently connected in series.

REFERENCE MARKS IN THE DRAWINGS

Figure 1:
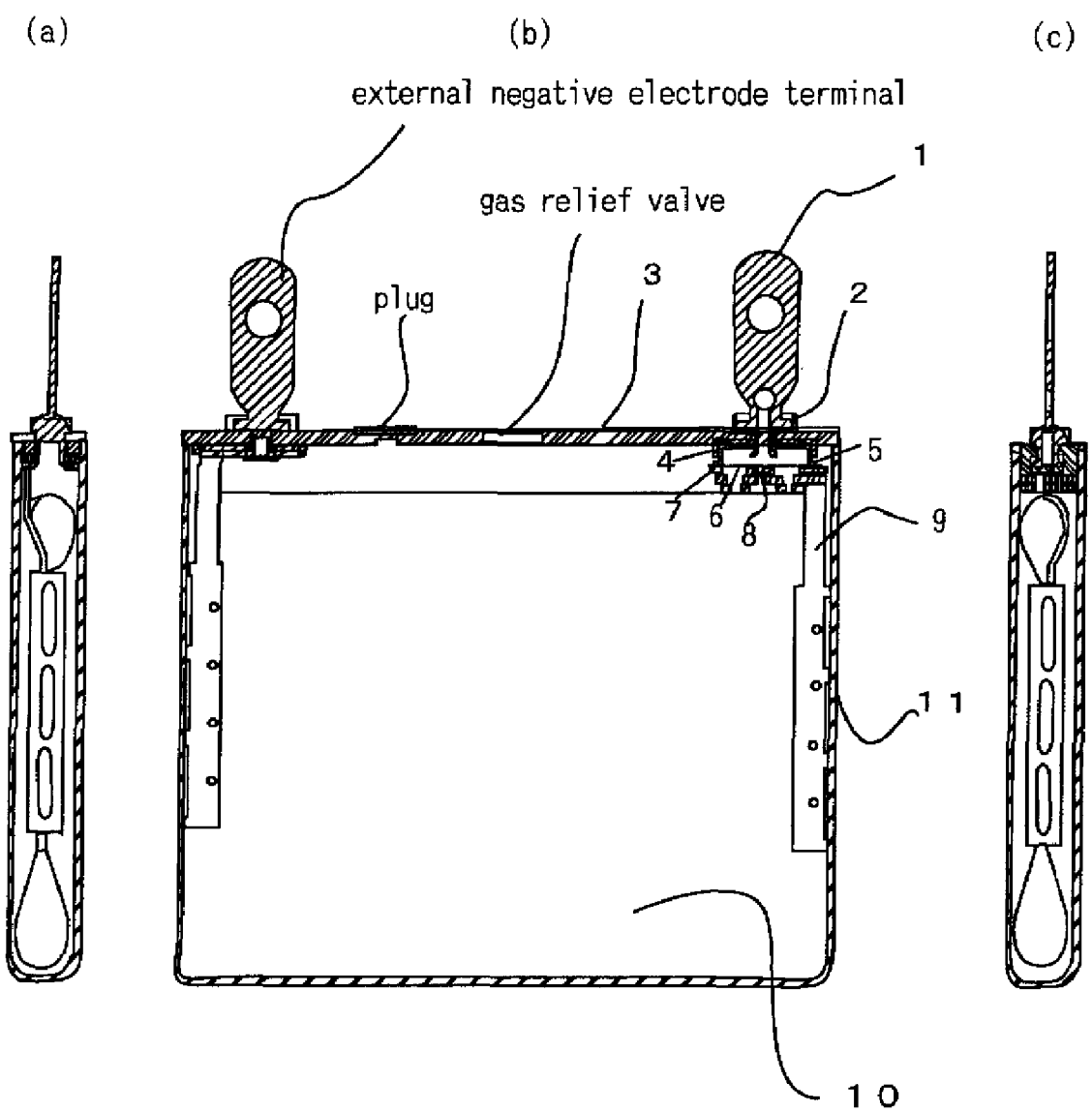
FIGS. 1A, 1B, and 1C are sectional views of a battery according to a first embodiment of the present invention.

1 external positive electrode terminal
2 gasket
3 sealing plate
4 insulating plate
5 sealing lead
6 diaphragm
7 current collecting tab holder
7*a* tab receiving portion
7*b* fixing portion
7*c* holder hole
8 metal thin film
9 current collecting tab
9*a* insert member
9*b* current collector connecting portion
9*c* throughhole
10 electrode assembly
11 outer can
12 sealing plate projection

DESCRIPTION OF THE PREFERRED EMBODIMENTS

Preferred embodiments of the present invention are described as follows.

First Embodiment

Figure 2:
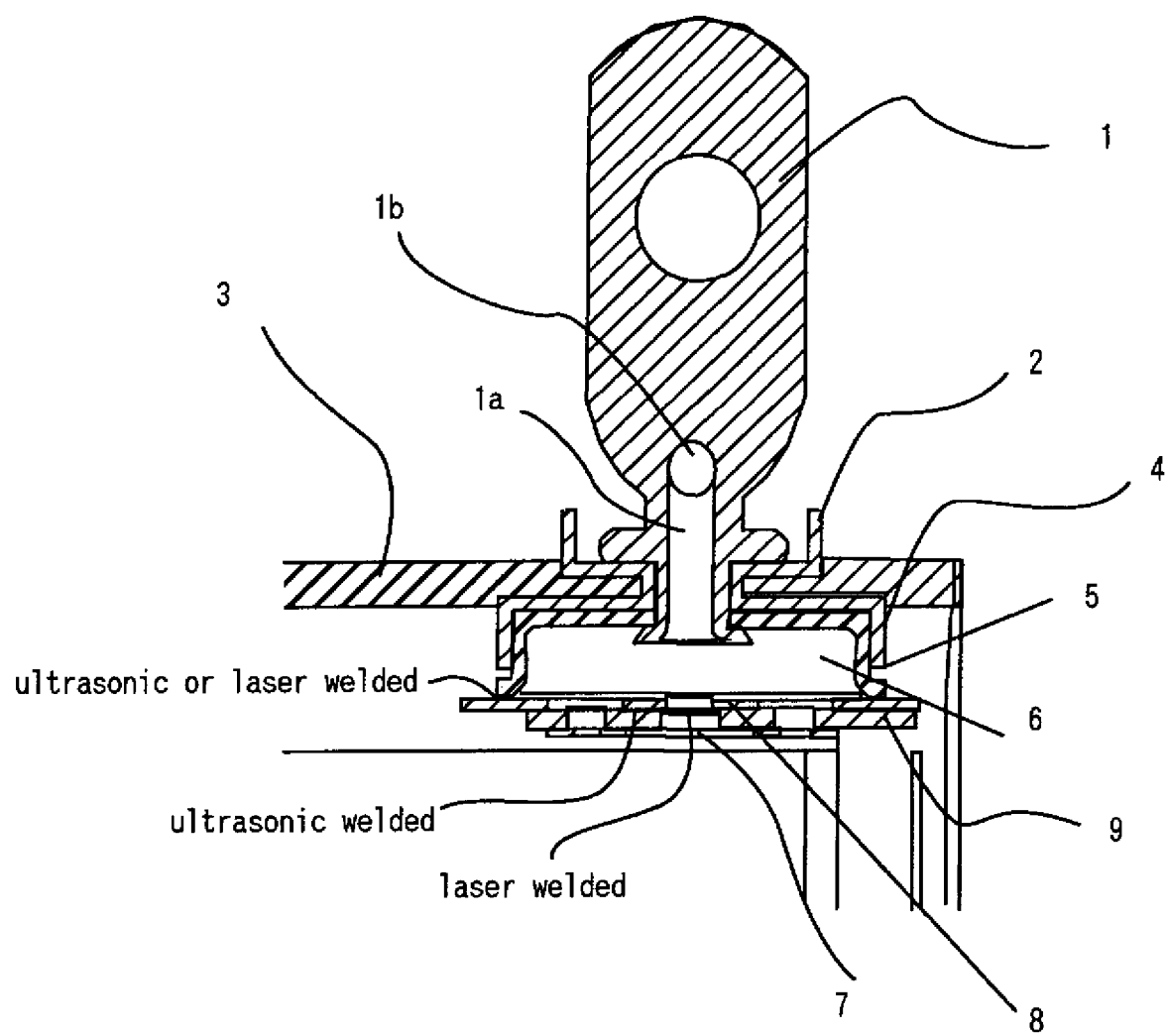
FIG. 2 is an enlarged sectional view of an essential part of the battery according to the first embodiment of the present invention.
Figure 3:
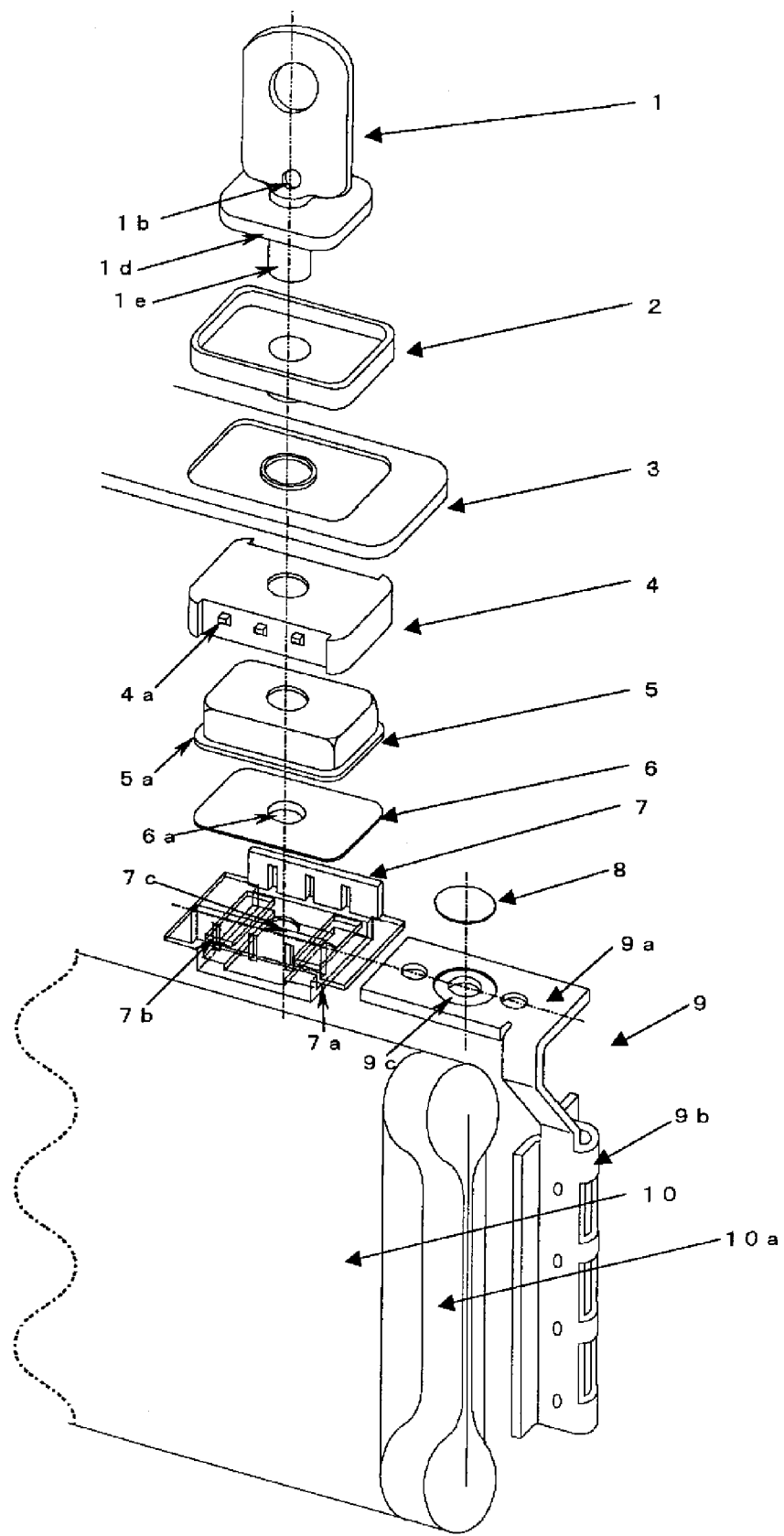
FIG. 3 is an exploded perspective view of the battery according to the first embodiment of the present invention.
Figure 4:
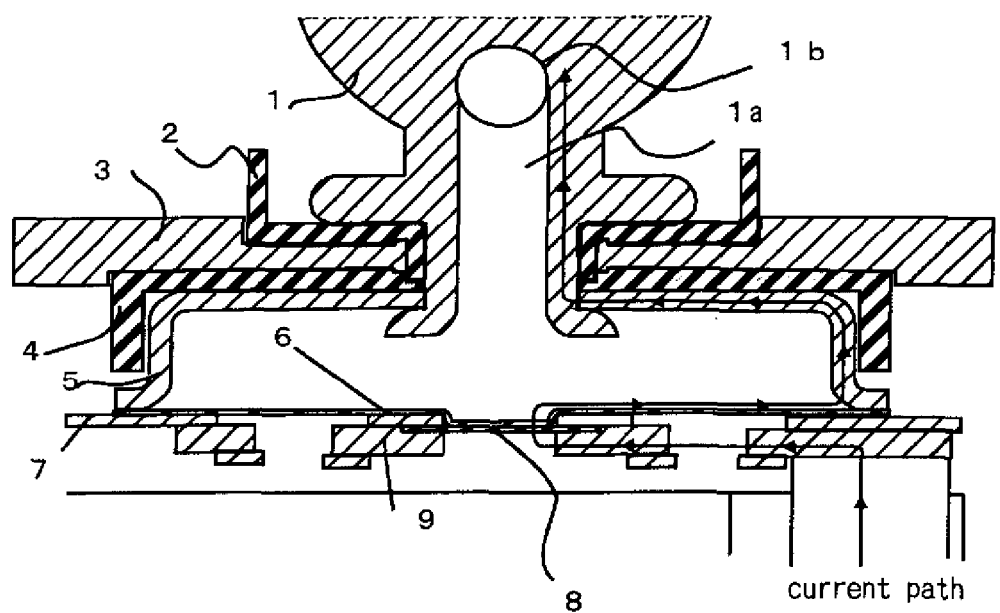
FIGS. 4A and 4B show the operation of the diaphragm of the battery according to the first embodiment of the present invention.
Figure 4:
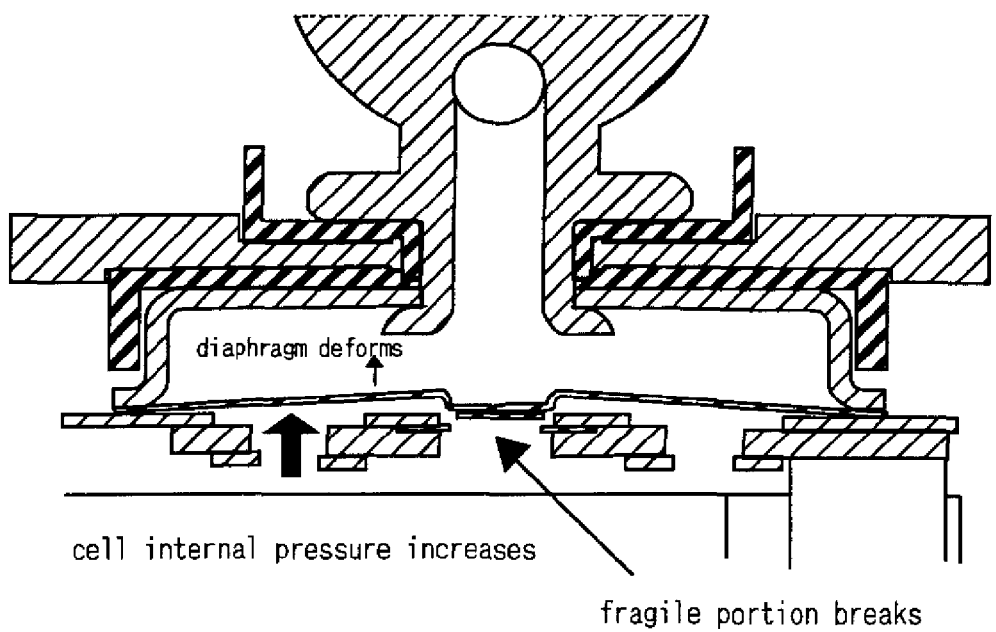
Figure 5:
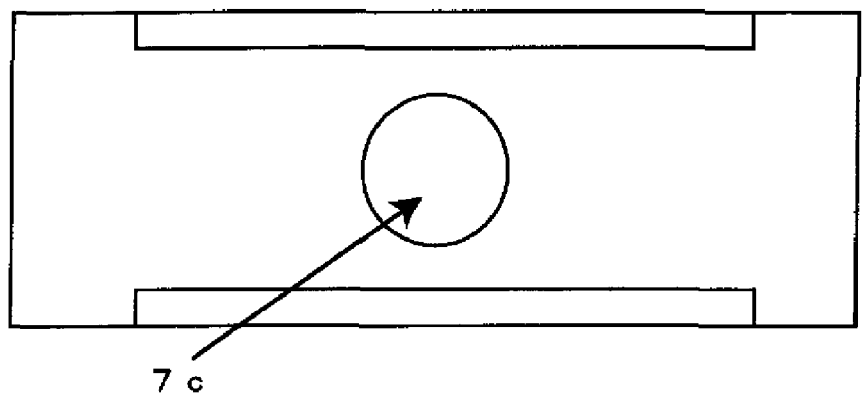
FIGS. 5A, 5B, and 5C are a plan view, a front view, and a right side view, respectively, of a current collecting tab holder of the battery according to the first embodiment of the present invention.
Figure 5:
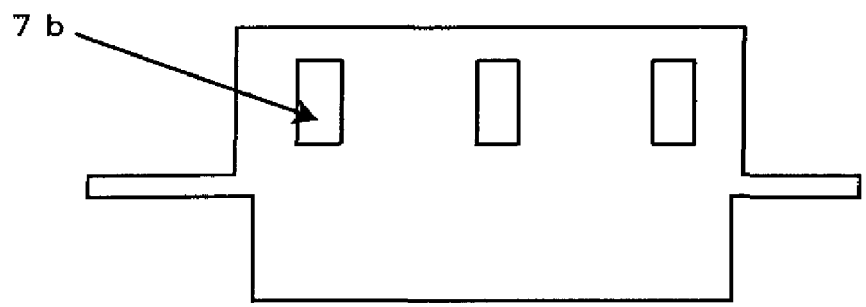
Figure 5:
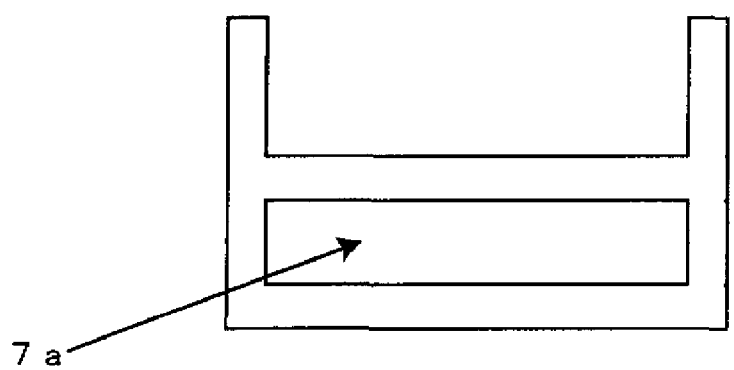
Figure 6:
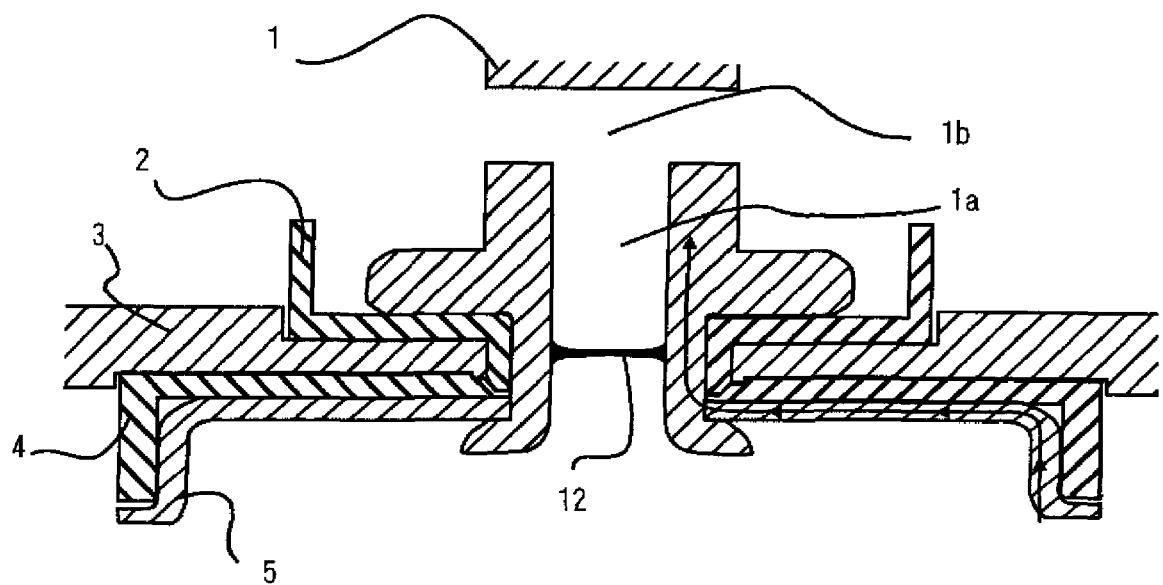
FIG. 6 is another enlarged sectional view of the essential part of the battery according to the first embodiment of the present invention.

FIGS. 1A-1C are sectional views of a battery according to a first embodiment; FIG. 2 is an enlarged sectional view of an essential part of the battery; FIG. 3 is an exploded perspective view of the battery; FIGS. 4A and 4B show the operation of the diaphragm of the battery; FIGS. 5A-5C show a current collecting tab holder of the battery; and FIG. 6 is another enlarged sectional view of the essential part of the battery.

As shown in FIGS. 1A-1C, the battery of the first embodiment includes an outer can 11 and a coiled electrode assembly 10 housed in the outer can 11 laterally to the can axis. The electrode assembly 10 comprises positive and negative electrodes coiled together. The outer can 11 is sealed with a sealing plate 3 having a gas relief valve. The sealing plate 3 has an external positive electrode terminal 1 and an external negative electrode terminal projecting outside the battery therefrom.

As shown in FIG. 3, the electrode assembly 10 has positive-electrode current-collector protrusions 10*a* projecting from one end thereof. The positive-electrode current-collector protrusions 10*a* are connected to a current collector connecting portion 9*b* of a current collecting tab 9. The positive-electrode current-collector protrusions 10*a* are a bundle of the protrusions of the positive electrode current collector protruding from one end of the electrode assembly 10.

As shown in FIG. 2, the external positive electrode terminal 1 fits a gasket 2, an insulating plate 4, and a sealing lead 5 to the sealing plate 3. The gasket 2 is made of an insulating resin so as to electrically insulate between the external positive electrode terminal 1 and the sealing plate 3. The insulating plate 4 is also made of an insulating resin so as to electrically insulate between the sealing plate 3 and the sealing lead 5. The external positive electrode terminal 1 and the sealing lead 5 are electrically connected to each other.

The sealing lead 5 is connected to diaphragm 6 in such a manner as to keep the airtightness of their connected areas, thereby providing an electrical connection between the diaphragm 6 and the external positive electrode terminal 1. Examples of the insulating resin include polypropylene, polyphenylene sulfide, polyetheretherketone, and a tetrafluoroethylene-perfluoroalkoxyethylene copolymer.

As shown in FIG. 2 and FIG. 4A, the inner center portion of the diaphragm 6 is electrically connected to the center portion of a metal thin film 8. The peripheral portion of the metal thin film 8 covers a throughhole 9*c* formed in an insert member 9*a* of the current collecting tab 9 disposed below the diaphragm 6.

As described above, instead of covering and sealing the throughhole 9*c* with the metal thin film 8, it is possible to make part of the planar insert member 9*a* as a thin-walled portion having a smaller thickness than the remaining portion by forging or cutting. The fragile portion controls the operating pressure due to which it is broken by controlling its strength (the thickness, for example, in the case of the metal thin film). The fragile portion maintains the sealed condition of the electrode assembly side before it breaks, and breaks earlier than any other components when the diaphragm 6 is deformed.

FIG. 3 is an exploded perspective view of an essential part of the battery before the insert member 9*a* of the current collecting tab 9 is inserted into a tab receiving portion 7*a* of a current collecting tab holder 7. FIGS. 5A-5C show the current collecting tab holder 7. As shown in FIG. 3, the current collecting tab 9 includes the insert member 9*a* to be inserted into the tab receiving portion 7*a* of the current collecting tab holder 7 and the current collector connecting portion 9*b* to be connected to the positive-electrode current-collector protrusions 10*a* of the electrode assembly 10. The tab receiving portion 7*a* is provided on both the inner and outer surfaces thereof with a holder hole 7*c*. The holder hole 7*c* is equal to or larger in area than the throughhole 9*c*. As shown in FIG. 3, the insert member 9*a* of the current collecting tab 9 is inserted into the tab receiving portion 7*a* of the current collecting tab holder 7.

As shown in FIGS. 4A, 4B, and 6, the external positive electrode terminal 1 includes therein a pressure release hole consisting of a vertical hole 1*a* and a horizontal hole 1*b*. The vertical hole 1*a* extends in the axial direction from the inner end to the outer end of the battery. The horizontal hole 1*b* has an opening open to the outside of the battery and is communicated with the vertical hole 1*a*. The horizontal hole 1*b* may be open at one side only.

FIGS. 4A and 4B show the operation of the diaphragm of the battery of the first embodiment. When the battery internal pressure is normal, as shown in FIG. 4A, the diaphragm 6 is supplied with a current from the current collecting tab 9 via the metal thin film 8. When the battery internal pressure increases, on the other hand, as shown in FIG. 4B, the center portion of the diaphragm 6 rises toward the outside of the battery, causing the metal thin film 8 connected thereto to break and tear, thereby interrupting the current flow from the current collecting tab 9 to the diaphragm 6.

In the aforementioned structure, the current collecting tab holder 7 protects the metal thin film 8 formed in the planar insert member 9a of the current collecting tab 9 from impact or vibration. This prevents the metal thin film 8 from being erroneously broken by impact.

How to assemble the current interrupting mechanism of the battery of the first embodiment is described with reference to FIG. 3. First of all, the coiled electrode assembly is prepared. The electrode assembly is disposed in such a manner that the protrusions of the positive electrode current collector protrude from one end thereof and the protrusions of the negative electrode current collector protrude from the other end thereof.

Next, the gasket 2 made of polyetheretherketone and the external positive electrode terminal 1 made of aluminum are stacked together from the side of the sealing plate 3 that corresponds to the outside of the battery. The insulating plate 4 made of polyetheretherketone and the sealing lead 5 made of aluminum are stacked together from the side of the sealing plate 3 that corresponds to the inside of the battery. The external electrode terminal 1 is provided at its bottom with a cylindrical portion 1c, which penetrates the respective holes of the gasket 2, the sealing plate 3, the insulating plate 4, and the sealing lead 5.

These members thus stacked are compressed vertically until the gasket 2 and the insulating plate 4 achieve a predetermined compressibility. The cylindrical portion 1c at the bottom of the external electrode terminal 1 is spread outward (swaged) and fixed.

The diaphragm 6 made of aluminum alloy is stacked on a flange 5a of the sealing lead 5 made of aluminum, and their contact area is entirely laser welded from the diaphragm 6 side so as to be sealed.

The metal thin film 8 made of aluminum is stacked on the throughhole 9c, which has a step portion, of the insert member 9a of the positive electrode current collecting tab 9 made of aluminum, and their contact area is ultrasonic welded.

The insert member 9a of the positive electrode current collecting tab 9 is inserted into the tab receiving portion 7a of the current collecting tab holder 7 made of polyetheretherketone. The tab receiving portion 7a is slightly larger than the insert member 9a, so that when the insert member 9a is inserted, the current collecting tab holder 7 and the positive electrode current collecting tab 9 are fixed to each other.

In the same manner as in the external positive electrode terminal described above, in the external negative electrode terminal, a gasket, an insulating plate, and a sealing lead are stacked together and swaged.

Hooks 4a of the insulating plate 4 are engaged with the fixing portions 7b of the current collecting tab holder 7 so as to fix the current collecting tab holder 7 and the insulating plate 4 to each other. The diaphragm 6 comes into contact at a center bottom 6a thereof with the metal thin film 8 via the holder hole 7c of the current collecting tab holder 7.

The metal thin film 8 is welded to the diaphragm 6 by applying laser spot welding from the side of the positive electrode current collecting tab 9 that is opposite to the side on which the metal thin film 8 has been welded. As a result, the gas pressure in the battery acts on the metal thin film 8 and the inner side of the diaphragm 6.

The positive-electrode current-collector protrusions 10a of the electrode assembly 10 are inserted into the bundled core of the positive electrode current collecting tab 9. The current collector connecting portion 9b is swaged to hold the positive-electrode current-collector protrusions 10a. Then, laser welding is applied to the side surface of the current collector connecting portion 9b so as to connect the positive electrode current collecting tab 9 and the electrode assembly 10. Then, in the negative electrode, a negative electrode current collecting tab is connected in the same manner.

The sealing plate 3 is laser welded to the outer can 11, and a non-aqueous electrolytic solution is poured through a solution supply hole formed on the sealing plate. The solution supply hole is sealed with a plug. The battery of the present invention is thus complete.

Five samples of the batteries of the present invention were subjected to a vibration test in which a vibration at an acceleration of 49 to 59 m/s$^2$ and a frequency of 10 to 15 Hz was applied two million cycles in the axial direction of each battery.

Five other samples of the batteries of the present invention were subjected to an impact test in which an acceleration of 98 m/s$^2$ was applied 10 cycles in the axial direction of each battery. These test results have indicated that there is nothing wrong with the batteries.

Second Embodiment

Figure 7:
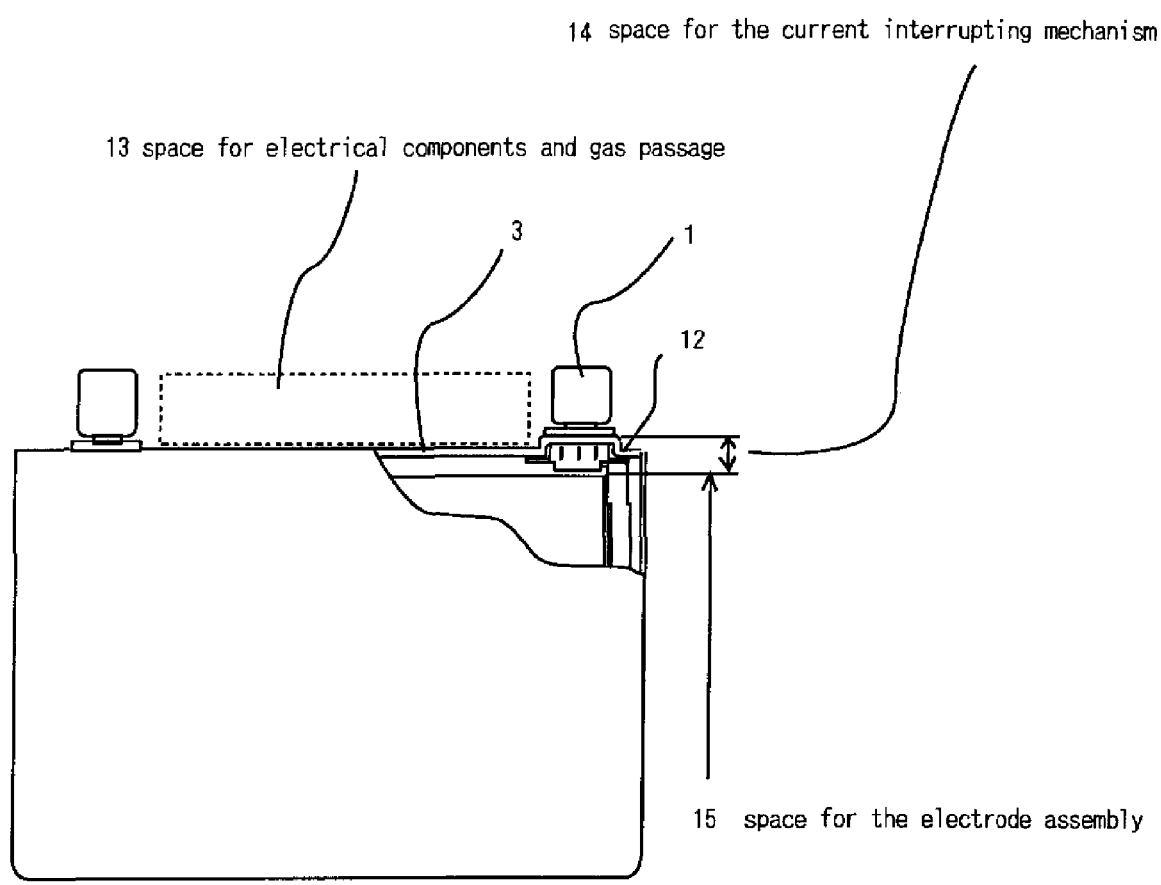
FIG. 7 is a front view of a battery according to a second embodiment of the present invention.
Figure 8:
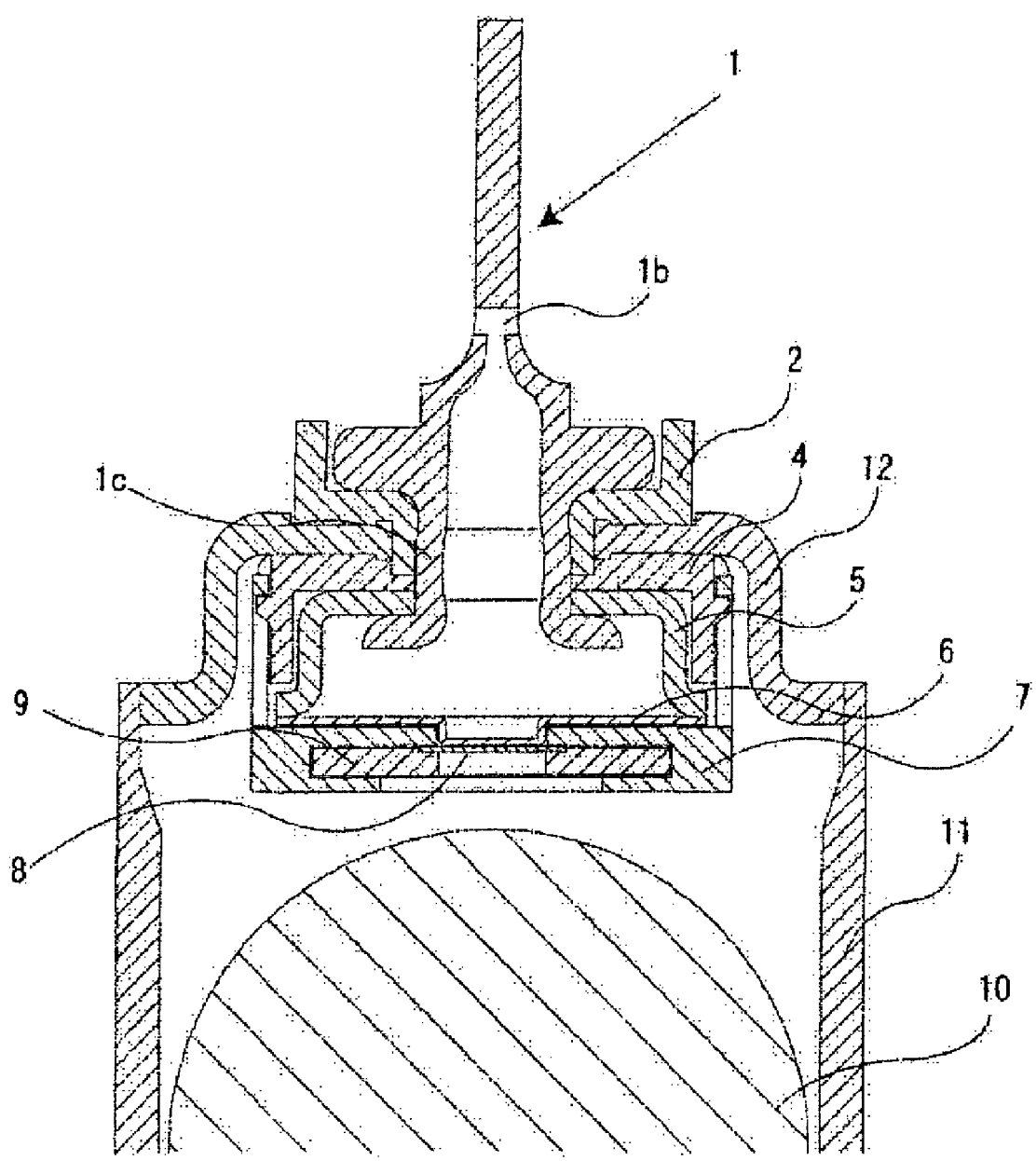
FIG. 8 is an enlarged right side view of an essential part of the battery shown in FIG. 7.

Another structure of the battery of the present invention is shown in FIGS. 7 and 8.

FIG. 7 is a front view of the entire battery according to the second embodiment, and FIG. 8 is an enlarged right side view of an essential part of the battery shown in FIG. 7.

As shown in FIG. 7, in the battery of the second embodiment, the sealing plate 3 from which the external electrode terminal 1 projects is provided with a projection 12 projecting toward the outside of the battery. The projection 12 accommodates one end (the bottom side) of the external electrode terminal 1 in its inner space and allows the other end or the top side of the external electrode terminal 1 to project to the outside of the battery. The bottom-side end of the external electrode terminal 1 is swaged as shown in FIG. 8 so as to fix the external electrode terminal 1 to the sealing plate 3.

In FIG. 7, the numeral 13 indicates a space used to provide electrical components or gas passages; the numeral 14 indicates a space to accommodate part or all of the current interrupting mechanism; and the numeral 15 indicates a space to accommodate the electrode assembly. In FIGS. 7 and 8, the components having similar functions as those shown in the first embodiment are referred to with the same reference numbers as those shown in the first embodiment. The second embodiment is basically identical to the first embodiment except that the sealing plate has the projection, so that the description of the common components will be omitted.

In general, in a large size battery, the space indicated by the numeral 13 is used to provide electrical components such as a voltage detection cable and a temperature detection cable, or a cell cooling passage and an exhaust gas passage that is used when a gas relief valve operates. Therefore, the external electrode terminal 1 is preferably disposed so as not to obstruct the space for these components. In the second embodiment, the projection is only part of the sealing plate 3 from which the external electrode terminal 1 projects. The projection allows the external electrode terminal to project therefrom and accommodates the bottom-side end of the external electrode terminal 1 in its inner space. This allows effective use of the battery outer surface and increases the accommodation volume of the electrode assembly 10, thereby increasing the size of the electrode assembly 10 and hence its battery capacity.

In FIG. 7, the external electrode terminal of only one pole (preferably the positive pole) projects from the projection, and the terminal of the other pole (on the left side of FIG. 7) projects from the flat surface to the outside of the battery. Alternatively, it is possible that the external electrode terminals of both the positive and negative poles may be designed to project from two projections.

INDUSTRIAL APPLICABILITY

As described hereinbefore, the non-aqueous electrolyte secondary battery of the present invention, which has a current interrupting mechanism with excellent impact and vibration resistance, is industrially useful.

What is claimed is:

1. A non-aqueous electrolyte secondary battery comprising:
    an outer can having an opening;
    an electrode assembly housed in the outer can, the electrode assembly comprising a positive electrode having a positive electrode current collector and a negative electrode having a negative electrode current collector;
    a sealing plate sealing the opening;
    a current collecting tab connected to one of the positive electrode current collector and the negative electrode current collector;
    an external electrode terminal projecting outside the sealing plate;
    a diaphragm disposed inside the sealing plate and outside the current collecting tab in the battery, the diaphragm being electrically connected to the external electrode terminal and deforming toward an outside of the battery when a battery internal pressure increases;
    a fragile portion connected at a center portion thereof to an inner surface of the diaphragm and also connected at a periphery thereof to the current collecting tab disposed below the diaphragm, the fragile portion breaking when the diaphragm deforms and rises upward, thereby interrupting current flow to the diaphragm;
    a current collecting tab holder into which a part of the current collecting tab is inserted, wherein
    the current collecting tab includes a planar insert member having the fragile portion and a current collector connecting portion connected to one of the positive electrode current collector and the negative electrode current collector;
    the current collecting tab holder is insulating and has a tab receiving portion into which an insert member of the current collecting tab is inserted, the tab receiving portion is provided on both an inner surface and an outer surface thereof with a holder hole, the holder hole overlapping with the fragile portion when the insert member is inserted;
    the diaphragm is disposed outside the tab receiving portion so as to cover the holder hole and is electrically connected at a center bottom thereof to the fragile portion via the holder hole;
    the external electrode terminal is swaged and fitted to a hole provided in the sealing plate via a gasket and an insulating plate;
    the current collecting tab holder is a different member from the gasket and the insulating plate; and
    wherein the diaphragm, external electrode terminal and current collecting tab holder are aligned in a plane that is perpendicular to the sealing plate.

2. The non-aqueous electrolyte secondary battery of claim 1, wherein
    the planar insert member of the current collecting tab has a throughhole; and
    the fragile portion is formed of a metal thin film covering the throughhole.

3. The non-aqueous electrolyte secondary battery of claim 1, wherein
    the current collecting tab is made of one of aluminum and aluminum alloy; and
    the external electrode terminal is a positive electrode terminal.

4. The non-aqueous electrolyte secondary battery of claim 1, wherein
    the sealing plate includes a flat surface and a projection projecting outside the flat surface, the projection allowing the external electrode terminal to project therefrom toward the outside of the battery and accommodating an inner end of the external electrode terminal in an inner space thereof.

5. The non-aqueous electrolyte secondary battery of claim 1, wherein
    the electrode assembly is a coiled electrode assembly comprising a positive electrode and a negative electrode coiled together and is housed in the outer can parallelly to a bottom of the can; and
    the current collector connecting portion of the current collecting tab is connected to one of positive-electrode current-collector protrusions and negative-electrode current-collector protrusions projecting from one end surface of the coiled electrode assembly.

6. The non-aqueous electrolyte secondary battery of claim 1, wherein
    the external electrode terminal is provided therein with a pressure release hole consisting of a vertical hole and a horizontal hole, the vertical hole extending in a perpendicular direction to the sealing plate from an inner end to an outer end of the battery, and the horizontal hole having an opening open to the outside of the battery and parallel to the sealing plate and being communicated with the vertical hole.

7. The non-aqueous electrolyte secondary battery of claim 1, wherein
    the sealing plate further includes a gas relief valve, and
    the fragile portion has a smaller operating pressure than the gas relief valve.

8. The non-aqueous electrolyte secondary battery of claim 1, wherein
    the outer can is prismatic in shape.

9. The non-aqueous electrolyte secondary battery of claim 2, wherein
    the current collecting tab is made of one of aluminum and aluminum alloy; and
    the external electrode terminal is a positive electrode terminal.

10. The non-aqueous electrolyte secondary battery of claim 9, wherein
    the sealing plate includes a flat surface and a projection projecting outside the flat surface, the projection allowing the external electrode terminal to project therefrom toward the outside of the battery and accommodating an inner end of the external electrode terminal in an inner space thereof.

11. The non-aqueous electrolyte secondary battery of claim 10, wherein
    the electrode assembly is a coiled electrode assembly comprising a positive electrode and a negative electrode coiled together and is housed in the outer can parallelly to a bottom of the can; and
    the current collector connecting portion of the current collecting tab is connected to positive-electrode current-collector protrusions or negative-electrode current-collector protrusions projecting from one end surface of the coiled electrode assembly.

12. The non-aqueous electrolyte secondary battery of claim 11, wherein
the external electrode terminal is provided therein with a pressure release hole consisting of a vertical hole and a horizontal hole, the vertical hole extending in a perpendicular direction to the sealing plate from an inner end to an outer end of the battery, and the horizontal hole having an opening open to the outside of the battery and parallel to the sealing plate and being communicated with the vertical hole.

13. The non-aqueous electrolyte secondary battery of claim 12, wherein
the sealing plate further includes a gas relief valve, and
the fragile portion has a smaller operating pressure than the gas relief valve.

14. The non-aqueous electrolyte secondary battery of claim 13, wherein
the outer can is prismatic in shape.

15. The non-aqueous electrolyte secondary battery of claim 5, wherein
the current collector connecting portion of the current collecting tab is designed to sandwich the one of the positive-electrode current-collector protrusions and the negative-electrode current-collector protrusions projecting from the one end surface of the coiled electrode assembly.

16. The non-aqueous electrolyte secondary battery of claim 15, wherein
the current collecting tab holder is made of an insulating resin.

17. The non-aqueous electrolyte secondary battery of claim 16, wherein
the planar insert member of the current collecting tab has a throughhole; and
the fragile portion is formed of a metal thin film covering the throughhole.

18. The non-aqueous electrolyte secondary battery of claim 17, wherein
the sealing plate includes a flat surface and a projection projecting outside the flat surface, the projection allowing the external electrode terminal to project therefrom toward the outside of the battery and accommodating an inner end of the external electrode terminal in an inner space thereof.

19. The non-aqueous electrolyte secondary battery of claim 18, wherein
the external electrode terminal is provided therein with a pressure release hole consisting of a vertical hole and a horizontal hole, the vertical hole extending in a perpendicular direction to the sealing plate from an inner end to an outer end of the battery, and the horizontal hole having an opening open to the outside of the battery and parallel to the sealing plate and being communicated with the vertical hole.

20. The non-aqueous electrolyte secondary battery of claim 19, wherein
the sealing plate further includes a gas relief valve, and
the fragile portion has a smaller operating pressure than the gas relief valve.

* * * * *